United States Patent
Karri et al.

(10) Patent No.: US 11,972,133 B2
(45) Date of Patent: Apr. 30, 2024

(54) MANAGEMENT OF SMART STORAGE AREAS

(71) Applicant: International Business Machines Corporation, Armonk, NY (US)

(72) Inventors: Venkata Vara Prasad Karri, Visakhapatnam (IN); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/474,745

(22) Filed: Sep. 14, 2021

(65) Prior Publication Data
US 2023/0084906 A1 Mar. 16, 2023

(51) Int. Cl.
*G06F 3/06* (2006.01)

(52) U.S. Cl.
CPC ............ *G06F 3/065* (2013.01); *G06F 3/0604* (2013.01); *G06F 3/0659* (2013.01); *G06F 3/0664* (2013.01); *G06F 3/0673* (2013.01)

(58) Field of Classification Search
CPC ...... G05B 13/00–048; G05B 15/00–02; G05B 17/00–02; G06F 1/00–3296; G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–986; G06F 17/00–40; G06F 21/00–88; G06F 2009/3883; G06F 2009/45562–45595; G06F 2015/761–768; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153; G06K 9/00–6298; G06N 3/00–126; G06N 5/00–048; G06N 7/00–08; G06N 10/00; G06N 20/00–20;
(Continued)

(56) References Cited

U.S. PATENT DOCUMENTS 6,476,718 B1 11/2002 Cartwright
8,019,464 B2 9/2011 Hoffjann
(Continued)

FOREIGN PATENT DOCUMENTS

EP 2743180 B1 7/2017

OTHER PUBLICATIONS

Sensor Solutions for Luggage Identification and More; Feb. 1, 2015; retrieved from https://www.airport-technology.com/contractors/baggage/sick-airport/pressreleases/presssensor-solutions-for-luggage-identification-and-more/ (Year: 2015).*
(Continued)

*Primary Examiner* — Daniel C. Chappell
(74) *Attorney, Agent, or Firm* — Haley J. McClory

(57) ABSTRACT

A processor may receive storage area information of a smart storage area. A processor may analyze the one or more objects associated with the smart storage area. A processor may determine a layout of the one or more objects. The layout may be based, at least in part, on one or more object parameters of the one or more objects and the storage area information. A processor may arrange the one or more objects in the layout.

20 Claims, 5 Drawing Sheets

(58) Field of Classification Search
CPC ........ G06N 99/00–007; G06T 1/00–60; G06V 30/00–43; G11B 20/00–24; G11B 33/00–1493; G11C 11/00–5692; G11C 13/00–06; G11C 14/00–009; G11C 15/00–06; G11C 16/00–3495; G11C 17/00–18; G11C 2207/00–229; G11C 2216/00–30; H01L 25/00–50; H01L 27/00–3293; H01L 2225/00–1094; H03M 7/00–707; H04L 9/00–38; H04L 12/00–66; H04L 41/00–5096; H04L 49/00–9094; H04L 61/00–59; H04L 67/00–75
See application file for complete search history.

(56) References Cited

U.S. PATENT DOCUMENTS

| | | | | |
|---|---|---|---|---|
| 9,390,560 | B2 * | 7/2016 | Meier | G06T 7/10 |
| 9,685,004 | B2 * | 6/2017 | Wang | G06T 7/73 |
| 10,073,646 | B2 * | 9/2018 | Ajila | G06F 3/067 |
| 10,678,482 | B2 * | 6/2020 | Ajila | G06F 3/065 |
| 10,789,062 | B1 * | 9/2020 | Suryanarayana | G06F 8/65 |
| 11,755,255 | B2 * | 9/2023 | Choi | G06F 3/0659 |
| | | | | 714/6.21 |
| 2010/0287511 | A1 * | 11/2010 | Meier | G06T 15/20 |
| | | | | 715/848 |
| 2014/0175228 | A1 * | 6/2014 | Durand | B64F 1/324 |
| | | | | 244/137.1 |
| 2016/0109280 | A1 | 4/2016 | Tiu | |
| 2017/0152044 | A1 | 6/2017 | Balasubramanian | |
| 2017/0206480 | A1 * | 7/2017 | Naumann | G06Q 10/06315 |
| 2017/0353943 | A1 * | 12/2017 | Skaaksrud | G06K 19/0712 |
| 2020/0088463 | A1 * | 3/2020 | Jeong | G06F 3/011 |
| 2022/0108088 | A1 * | 4/2022 | Volkerink | G06K 19/07372 |
| 2022/0282910 | A1 * | 9/2022 | Jeong | F25D 23/028 |

OTHER PUBLICATIONS

S. S. Kumar, D. Hemanth, S. Dwneeth, K. Dilip and A. Divyatej, "Automated Package Delivery Accepting System—Smart Freight Box," 2019 4th International Conference on Recent Trends on Electronics, Information, Communication & Technology (RTEICT), Bangalore, India, 2019, pp. 1510-1514. (Year: 2019).*

X. Liu et al., "Wireless Measurement and Control System of Environmental Parameters in Greenhouse Based on ZigBee Technology," 2018 37th Chinese Control Conference (CCC), Wuhan, China, 2018, pp. 7268-7273, doi: 10.23919/ChiCC.2018.8483023. (Year: 2018).*

J. M. Aitken et al., "Autonomous Nuclear Waste Management," in IEEE Intelligent Systems, vol. 33, No. 6, pp. 47-55, Nov.-Dec. 2018, doi: 10.1109/MIS.2018.111144814. (Year: 2018).*

Anonymous. "KLM launches Augmented Reality for hand baggage check." Published Sep. 7, 2018. 3 pages. Published by KLM Royal Dutch Airlines. https://news.klm.com/klm-launches-augmented-reality-for-hand-baggage-check/.

Anonymous. "Autonomous Baggage Handling Method & System." Published Aug. 5, 2019. 6 pages. Published by IP.com. https://priorart.ip.com/IPCOM/000259365.

Anonymous. "Method and System for Directing and Optimizing Placement of Carry-On Luggage Using an Digital Image Dimensioning Device." Published Jan. 24, 2014. 3 pages. Published by IP.com. https://priorart.ip.com/IPCOM/000234648.

Anonymous. "Real Time Onboard Luggage Optimization." Published Feb. 7, 2018. 6 pages. Published by IP.com. https://priorart.ip.com/IPCOM/000252751.

Anonymous. "Sensor Solutions for Luggage Identification and More." Published Feb. 1, 2015. 8 pages. Published by Airport Technology. https://www.airport-technology.com/contractors/baggage/sick-airport/pressreleases/presssensor-solutions-for-luggage-identification-and-more/.

Anonymous. "Smart Vehicle Recognition of Passengers and Baggage." Published Mar. 31, 2020. 6 pages. Published by IP.com. https://priorart.ip.com/IPCOM/000261737.

Anonymous. "TSA and Airline Interlock for Baggage Space Optimization." Published Jun. 18, 2015. 5 pages. Published by IP.com. https://priorart.ip.com/IPCOM/000242099.

Mell, et al., "The NIST Definition of Cloud Computing," Recommendations of the National Institute of Standards and Technology, U.S. Department of Commerce, Special Publication 800-145, Sep. 2011, 7 pgs.

Tech Insider, "Conveyor Belt Can Move Packages In Any Direction." Published Jun. 4, 2018. 3 pages. Published by Youtube. https://www.youtube.com/watch?app=desktop&v=XAokGOEjAFs.

* cited by examiner

MANAGEMENT OF SMART STORAGE AREAS

BACKGROUND

The present disclosure relates generally to the field of storage, and more particularly to the field of optimizing storage areas. Optimizing how objects are stored is an important consideration for many industries, particularly industries where storage space is limited. Optimizing storage in storage areas with limited space not only ensures the available space is efficiently used, but may also ensure that the stored objects are not damaged.

SUMMARY

Embodiments of the present disclosure include a method, computer program product, and system for storing one or more objects in a smart storage area. A processor may receive storage area information of a smart storage area. A processor may analyze the one or more objects associated with the smart storage area. A processor may determine a layout of the one or more objects. The layout may be based, at least in part, on one or more object parameters of the one or more objects and the storage area information. A processor may arrange the one or more objects in the layout.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
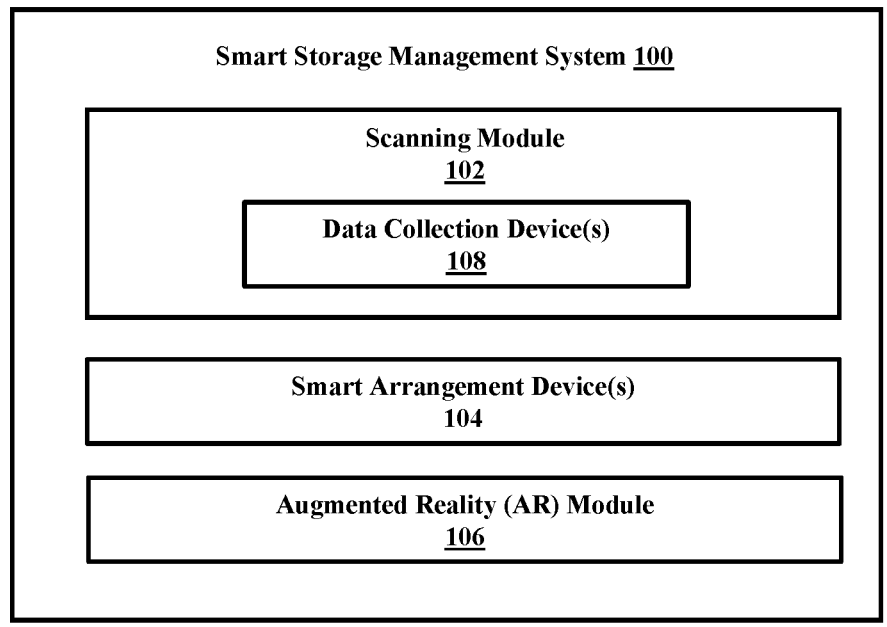
FIG. 1 depicts a block diagram of an embodiment of a smart storage management system, in accordance with the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

The present disclosure relates generally to the field of storage, and more particularly to the field of optimizing storage areas, such as those storage areas associated with aircrafts. While the present disclosure is not necessarily limited to such applications, various aspects of the disclosure may be appreciated through a discussion of several examples using this context.

The limited space available on airplanes has resulted in airlines producing regulations that attempt to limit the type and weight of objects a passenger may travel with. For example, some airlines require passenger pay an additional fee to store objects in a particular storage area of the aircraft (e.g., checked luggage) while allowing passengers to store objects of a particular size and weight (e.g., carry-on luggage) in the cabin area of an airplane for free. While such regulations may have resulted in a decrease in the number of objects required to be carried by an aircraft, such regulations have also resulted in an increase in luggage or objects in the already limited storage space in the cabin area of the aircraft. As such, there is a desire to optimize such storage areas, as well as other types of storage areas where available storage space may be limited.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

It will be readily understood that the instant components, as generally described and illustrated in the figures herein, may be arranged and designed in a wide variety of different configurations. Accordingly, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined or removed in any suitable manner in one or more embodiments. For example, the usage of the phrases "example embodiments," "some embodiments," or other similar language, throughout this specification refers to the fact that a particular feature, structure, or characteristic described in connection with the embodiment may be included in at least one embodiment. Accordingly, appearances of the phrases "example embodiments," "in some embodiments," "in other embodiments," or other similar language, throughout this specification do not necessarily all refer to the same group of embodiments, and the described features, structures, or characteristics may be combined or removed in any suitable manner in one or more embodiments. Further, in the FIGS., any connection between elements can permit one-way and/or two-way communication even if the depicted connection is a one-way or two-way arrow.

Also, any device depicted in the drawings can be a different device. For example, if a mobile device is shown sending information, a wired device could also be used to send the information. The term "module" may refer to a hardware module, software module, or a module may be a combination of hardware and software resources. Embodiments of hardware-based modules may include self-contained components such as chipsets, specialized circuitry, one or more memory devices and/or persistent storage. A software-based module may be part of a program, program code or linked to program code containing specifically programmed instructions loaded into a memory device or persistent storage device of one or more data processing systems operating as part of the computing environment (e.g., smart storage management system 100).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application and to enable others of ordinary skill in the art to understand the disclosure for various embodiments with various modifications as are suited to the particular use contemplated.

In embodiments discussed herein, solutions are provided in the form of a method, system, and computer program product, for storing one or more objects in a smart storage area. Embodiments contemplated herein may enable a user (e.g., passenger, airplane staff, etc.) to optimize the storage of one or more objects in a smart storage area (e.g., cabin storage area). Such embodiments may be used by various industries where storage space may be limited. For example, some airlines allow passengers to carry one or more objects (e.g., luggage, briefcases, etc.) that can be stored in the cabin area of the aircraft. Often in these situations, the one or more objects, or pieces of luggage each passenger intends to store in the cabin area, may have different properties (e.g., different dimensions, different levels of fragility, etc.) that result in the already limited cabin storage areas being inefficiently utilized. Accordingly, embodiments contemplated herein allow for the management of such storage areas and may enable the one or more objects to be stored in an optimal manner. These embodiments may ensure that the storage areas, particularly those storage areas having limited storage space, are efficiently organized.

In embodiments, a smart storage area may include any number or combination of one or more data collection devices. The one or more data collection devices may include, but are not limited to Internet of Things (IoT) devices, cameras, ultrasounds, devices configured to detect one or more biological parameters, or any combination thereof.

In embodiments, a processor may be configured to receive storage area information or data associated with a smart storage area collected by one or more data collection devices. Data collection devices may be configured by a processor to collect storage area information in real-time and/or to collect storage area information over time. In these embodiments, a processor may store the collected/received storage area information in a historical repository.

Storage area information may include any data or information associated with the smart storage area(s). Examples of data associated with storage area information may include, but are not limited to: i) the configuration of the smart storage area (e.g., open area, shelving, storage compartments, etc.) ii) the dimensions of the smart storage area, iii) what objects are currently occupying the smart storage area, iv) amount of space available for storage of objects (e.g., space not already occupied by other objects), and v) properties (e.g., object parameters) of the objects stored currently associated with the smart storage area. In some embodiments, a processor may receive storage area information from one or more databases. For example, in some embodiments, a processor could receive information from a particular database about the configurations of specific smart storage areas associated with a particular structure (e.g., particular aircraft). In these embodiments, the storage area information could indicate the location of the smart storage area as well as the available spatial dimensions of the smart storage area.

In embodiments, a processor may be configured to analyze the storage area information associated with the smart storage area. In these embodiments, a processor may use artificial intelligence (AI) and machine learning techniques to analyze the storage area information stored in the historical repository as well as real-time data collected from the one or more data collection devices. In one example embodiment where the smart storage area is located within an aircraft, a processor could collect a variety of storage area information from various sources. In this example embodiment, a processor could receive and analyze the blueprints associated with the particular aircraft (e.g., from an aircraft information database) and determine (e.g., using AI and machine learning techniques) where the smart storage areas may be located on the aircraft as well as the spatial dimensions of any smart storage area. For example, in this example embodiment, a processor could identify that there is a smart storage area in an overhead storage area of the cabin of the airplane. Continuing the example, a processor could collect/receive real-time storage area information that after analysis may indicate if there are any objects (e.g., luggage) occupying the overhead storage area as well as what those objects maybe. For example, in this embodiment, a processor could determine that the objects currently occupying the overhead storage area are medical supplies the aircraft is transporting and that the supplies are occupying a quarter of the available storage space.

In some embodiments, a processor may analyze the one or more objects and determine one or more object parameters associated with a particular object. An object parameter may include any property or feature of the object including, but not limited to, the shape object, the dimensions of the object (e.g., dimensions of regular/irregular shaped objects), the weight of the object, the hardness or softness of the object, the material(s) the object is composed of, the color of the object, or any combination thereof. In embodiments, a processor my determine or identify any number of object parameters associated with a particular object. Continuing the above example embodiment, a processor could analyze the medical supplies currently occupying the overhead storage area (e.g., smart storage area) and determine the object parameters of each medical supply (e.g., packaged medical supplies). In this example embodiment, a processor could determine a particular medical supply has a particular shape, the dimensions of the particular medical supply, the hardness of the medical supply packaging, and the level of fragility as it pertains to the packaging and/or the particular medical supply itself (e.g., if the medical supply is made of glass). In embodiments, a processor may analyze these object parameters to determine if the medical supplies are likely to move during transport, need to be stored in a particular way as to ensure a fragile medical supply is not damaged, as well as to determine the amount of space each individual medical supply may be occupying.

In some embodiments, a processor may configure a data collection device outside the smart storage area to collect storage area information associated with the one or more objects prior to the objects entering the smart storage area. In these embodiments, a processor may receive storage area information associated with the one or more objects prior to the objects entering the smart storage area. In one example embodiment, a data collection device may be situated on an aircraft and scan passengers' luggage (e.g., one or more objects). In this example embodiment, the processor (e.g., via the data collection device) may collect one or more object parameters associated with each of the pieces of luggage.

In some embodiments, a processor may receive storage area information from a user/passenger prior to boarding the aircraft regarding a particular object. In these embodiments, a passenger may indicate that their luggage includes fragile items (e.g., one or more object parameters). In these embodiments, a passenger may indicate what objects and the object parameters they intend to store in the smart storage area of the aircraft. Such embodiments may be used where the fragility of an object is not immediately apparent. For example, if a user/passenger utilizes traditional carry-on luggage suitcases to carry glass items, a processor may not always be able to detect that the object (e.g., suitcase) contains glass items. In these embodiments, a processor may be configured to receive this storage area information (e.g., object parameters) from an application or website associated with the passenger's flight purchase and which the passenger has opted-in to have their object parameters relayed to the processor.

In some embodiments, a processor may further analyze the one or more objects and the smart storage area by generating one or more simulations. In embodiments, a processor may use object parameters, storage area information, and/or information stored in the historical repository to produce a digital twin of the one or more objects in the smart storage area. In these embodiments, a processor may utilize AI and machine learning techniques to generate and simulate the digital twin. Using such simulations and techniques, a processor may identify one or more layouts of the one or more objects in the smart storage area. A layout may include an design of how each of the one or more objects in the smart storage area should be arranged in the smart storage area.

In embodiments, a processor may base the layout of one or more objects, at least in part, on one or more object parameters of each of the one or more objects, and the storage area information associated with the smart storage area. In some embodiments, a processor may base the layout on a layout factor. In these embodiments, a processor may receive a layout factor from a user or administrator (e.g., aircraft staff, passengers, etc.). The layout factor indicates what factors and/or object parameters are prioritized by a processor over other object parameters while simulating/analyzing and determining the layout. The layout factor may include different layout aspects a processor may consider when analyzing the one or more objects in the smart storage area and identifying the layout. For example, a smart storage area may have a layout factor that prioritizes space efficiency. In this example, a processor would identify a layout and arrange the one or more objects in such a way as to ensure the amount of available space in the smart storage area is maximized while the amount of space the objects occupy is minimized (e.g., there is minimal spacing between two objects). In another example, a smart storage area may have a layout factor that prioritizes the level of fragility of the one or more objects. In this example, when analyzing and simulating a layout a processor will ensure that fragile objects are arranged in a particular layout (e.g., with sufficient space provided between each object) as to reduce the likelihood of the fragile object falling or being damaged by other objects while stored during transportation. In some embodiments, a processor may receive a layout factor that includes that requires the processor to consider multiple aspects. For example, in some embodiments, a layout factor may indicate that the one or more objects should be arranged in the most optimal way. In these embodiments, a processor may identify a layout that may ensure the available storage space associated with the smart storage area is efficiently used while also ensuring objects that are fragile or soft (e.g., flowers) are stored in such a manner as to reduce or limit the likelihood of damage to those fragile or soft objects.

In embodiments, a processor may indicate that the one or more objects should be arranged in the smart storage area, as indicated by the identified layout. In some embodiments, a processor may generate an augmented reality (AR) environment associated with the smart storage area. An AR environment may include an overlay of the smart storage area, that may not otherwise be visible to a user (e.g., due to physical barriers, such as overhead storage doors or other luggage). In these embodiments, a processor may configure the AR environment to indicate to a user where, based at least in part on the storage area information associated the object the user plans to store (e.g., object parameters gathered by data collection devices outside the smart storage area) and the identified layout (e.g., generated using digital twin simulations), the user may store their object.

In embodiments, a processor may utilize AI enabled digital twin technology to simulate how the identified layout may be impacted by the addition of new objects to a smart storage area already storing one or more objects. In these embodiments, a processor may utilize this digital twin simulation information to generate and constantly update the AR environment. In embodiments, a processor may configure an AR device, such as an AR headset, to display the AR environment of the smart storage area to a user/passenger.

In one example embodiment, a processor may receive storage area information (e.g., object parameters) from a scanner (e.g., data collection device) about their particular piece of luggage (e.g., object) when the passenger enters the aircraft. In this embodiment, a processor could analyze the storage area information associated with the luggage and identify the dimensions of the luggage and that the luggage is hard and not soft (e.g., the luggage suitcase is made of hard plastic). In this example embodiment, a processor could analyze the storage area information and produce one or more simulations (e.g., using a digital twin) associated with the available smart storage area, to identify where the passenger should store their luggage (e.g., the identified layout). A processor may then generate an AR environment indicating where the passenger may store their luggage. In such embodiments, the passenger (e.g., user) may wear an AR headset or other AR device to view the AR environment. The AR environment may include a variety of indicators that may direct the passenger to where they should store their luggage. For example, in some embodiments, the AR environment may highlight the portion of the smart storage area the luggage may be stored in or instruct the user/passenger with directional arrows where they should store their luggage. In some embodiments, the crew of the aircraft may use the AR environment to direct passengers to where there may be available space within the smart storage area.

In some embodiments, a processor may determine that the object or luggage should be stored in a different area. For example, continuing the above example, a processor could determine that the object or luggage is too large for the smart storage area (e.g., overhead storage area) and recommend to the user/passenger to check their luggage with other large items in another storage area in the aircraft. Alternatively, a processor may analyze the object the user/passenger is planning to store and due to the object parameters of the particular object, a processor may instruct the user/passenger to store the item in a non-smart storage area, such as those storage areas commonly provided under the seats of the airplane.

In embodiments, a processor may arrange the one or more objects in the arrangement provided by the layout. In some embodiments, a smart storage area may include one or more smart arrangement devices, such as intelligent conveyor devices or robotic arms. In embodiments, a processor may configure the one or more smart arrangement devices to move the one or more objects in any direction, based on analyzing (e.g., using smart modeling and/or digital twin simulations) storage information. While embodiments contemplated herein may often make reference to smart storage area having intelligent conveyor devices, such embodiments should not be considered limiting as any other similarly configured smart device capable of moving the objects, such as a robotic arm or magnetic orientation devices (e.g., using magnetism to align and orient objects), may alternatively be used. In embodiments, a smart storage area may include a plurality of smart arrangement devices (e.g., modular smart arrangement devices) having at least one selective portion that enables the intelligent conveyor device to rotate and arrange the one or more objects in a particular way (e.g., a particular layout within the smart storage area). In embodiments, as contemplated herein, a processor may be configured to utilize artificial intelligence (AI) capabilities and machine learning techniques to configure the one or more smart arrangement devices to work in concert to move/align the one or more objects to a particular location within the smart storage area, based on the identified layout.

In one example embodiment, a variety of objects have been placed in the overhead storage area of an aircraft (e.g., smart storage area) by one or more users/passengers. In this example, the variety of objects could include flowers, a large suitcase, a small soft suitcase, a briefcase, and a garment bag. In this example embodiment, a processor may receive storage area information that enables the processor to identify the objects and/or one or more object parameters (e.g., size of the object, weight, fragility, dimensions, etc.). A processor may then use AI and machine learning techniques (e.g., digital twin technology) to analyze and identify the optimal layout that arranges the variety of objects in such a way as to ensure that all of the objects are efficiently stored and that potential damage to the objects, such as the flowers and garment bag, is reduced. In this example embodiment, after a processor has identified the optimal layout that mitigates or reduces the likelihood of the flowers, and garment bag being damaged, a processor may configure or instruct a plurality of intelligent conveyor devices (e.g., smart arrangement devices) to move or arrange each of the variety of objects to a particular location and alignment with the other objects as identified in the layout.

In embodiments, as contemplated herein, a processor may analyze the smart storage area and continuously receive real-time storage area information. In embodiments where a processor may have already arranged the one or more objects into a particular layout (e.g., using smart arrangement devices), a processor may collect/receive storage area information associated with a new object and one or more object parameters (e.g., new object parameters) that has not been arranged or stored within the smart storage area. In these embodiments, a processor may generate one or more simulations (e.g., using digital twin technology) associated with the one or more objects and the new object. The processor may then generate an updated layout or new layout that includes the previously stored objects and the new object. Once a layout has been identified (e.g., AI enable digital twin technology), a processor may then rearrange the objects (e.g., the previously stored objects and the new object) in the smart storage space to reflect the updated layout.

For example, in one example embodiment, a series of passengers may have stored each of their respective suitcases (e.g., objects) in the overhead storage area configured with intelligent conveyor devices. As each passenger stores their suitcase, a processor may receive a continuous real-time feed associated with where the suitcase has been placed in the overhead storage area and what properties or object parameters the suitcase may have (e.g., storage area information). Depending on this real-time feed of storage area information, the processor may be continuously updating and/or reconsidering the layout and arrangement of suitcases as each of the series of passengers places their luggage in the overhead storage area. As a processor updates the layout the processor may also instruct the intelligent conveyor devices to arrange the suitcases to reflect the layout. While in some situations a suitcase may be easily included in the prior layout, in other embodiments, the prior layout may have to be significantly altered to enable the suitcases to be arranged in an optimal manner. Depending on the object parameters of each suitcase, the smart arrangement devices may be configured to change the position and ensure there are appropriate or necessary gaps (e.g., as determined during simulation) between objects that require the addition space.

In some embodiments, a processor may detect if one of the one or more objects was damaged while it was stored in the smart storage area (e.g., there is a rattling inside the object after a transport, a user indicates damage, etc.). In these embodiments, a processor may generate a damage report associated with how the damage may have occurred. This damage report and associated information may be stored in the historical repository. In some embodiments, this information may be accessed while the processor is performing various analyses or simulations to generate improved layouts and arrangements of objects that reduce or prevent the likelihood of similar damage occurring again.

In embodiments, a processor may determine that the arrangement process is complete. In these embodiments, a processor may generate a notification to the user that provides the user with the exact position of the user's stored object. Such embodiments enable users/passengers to quickly locate their objects and exit the aircraft.

In some embodiments, a processor may configure the smart arrangement devices to remove one of the objects from the arrange layout. In an example embodiment, if a user/passenger needs access to an object that is already stored in the smart storage space, the user/passenger may approach the smart storage area. In this embodiment, a processor may utilize various recognition software to identify the user/passenger. The processor may then access and utilize historical storage space information to determine which object belongs to the user/passenger. Once the proper object is determined, the processor may then generate one or more simulations (e.g., using digital twin technology) to generate a particular layout that moves the object in such a way that the user/passenger can more easily access it. For example, an object may be arranged behind one or more other objects toward the back of the smart storage area, furthest away from location the user/passenger may access it (e.g., closer to the cabinet door). In such an example embodiment, a processor may instruct the one or more smart arrangement devices (e.g., intelligent conveyor devices) to arrange the object closer to the user/passenger as was reflected by the particular layout.

In another example embodiment, a processor may generate and arrange the one or more objects in a layout that enable users/passengers to easily retrieve their luggage stored in an overhead storage area as they deplane the aircraft. In such embodiments, a processor may continuously update the layout as each object is retrieved from the smart storage space to ensure each user/passenger can easily retrieve their object/luggage.

In some embodiments, a processor may assign a unique key to each of the one or more objects. The unique key may provide identifying information regarding to whom the object belongs to. For example, the unique key on a piece of luggage may include a barcode that indicates which passenger the luggage belongs to. In embodiments where a user/passenger loses or forgets an object, the unique key may be used to return the object to the user/passenger. In some embodiments, a processor may detect the user/passenger is about to leave the area or aircraft without their object. In these embodiments, a processor may be configured to alert the passenger that they may be forgetting an object in the smart storage area. The processor may generate any type of alert, such as an audible alarm or a text message.

In some embodiments, a smart storage space may be configured with one or more locks. The one or more locks may be configured in a variety of ways including, but not limited to, magnetic locks, biometric locks (e.g., fingerprint scan, ultrasound, retinal scan, etc.), external hinge locks, or any combination thereof. In some embodiments, a processor may configure one or more of the locks to automatically secure the one or more objects. In these embodiments, a processor may ensure (e.g., using biometric locks that recognize the passenger) that only the owner of the object may unlock and/or remove the object from the smart storage area. In some embodiments, a processor may utilize the unique key assigned to each object that only allows the owner of the object (e.g., user/passenger) to unlock the object. Such embodiments ensure that objects are not lost or mistakenly removed from the smart storage area by other users/passengers.

Referring now to FIG. 1, a block diagram of smart storage management system 100 for managing one or more objects in a smart storage area, is depicted in accordance with embodiments of the present disclosure. FIG. 1 provides an illustration of only one implementation and does not imply any limitations with regard to the environments in which different embodiments may be implemented. Many modifications to the depicted environment may be made by those skilled in the art without departing from the scope of the invention as recited by the claims. In some embodiments, the solar panels may be directed by the computing device to move to a more advantageous angle.

In embodiments, smart storage management system 100 may include scanning module 102, smart arrangement device(s) 104, and/or AR module 106. In embodiments, scanning module 102 may include one or more data collection devices 108 (e.g., cameras, IoT, ultrasound, etc.). Data collection devices, as discussed herein, may be configured to collect storage area information and all other data/information as contemplated herein, such as object parameters associated with the one or more objects (e.g., object dimensions, shape, weight, fragility, softness/harness etc.) and properties associated with the smart storage area (e.g., available space, current layout of objects, etc.). In some embodiments, scanning module 102 may be configured to continuously scan (e.g., collect/receive storage area information) the smart storage area to analyze the available space. In some embodiments, scanning module 102 may be to store the storage area information in a historical repository. In these embodiments, smart storage management 100 may be configured to use AI and machine learning techniques to analyze the smart storage area. For example, in such embodiments, smart storage management 100 may identify appropriate space gaps between any pair of cabin luggage having different object parameters. In some embodiments, smart storage management 100 may generate damage reports based, at least in part, on the historical storage area information collected by scanning module 102. In some embodiments, scanning module 102 may be configured to use ultrasound technology to collect biometric information from a user/passenger. In these embodiments, scanning module 102 may generate a 3D image of the user/passenger's finger or hand that may be used to correctly identify which object corresponds to the user/passenger.

In embodiments, smart storage management 100 may configure one or more smart arrangement devices 104, such as intelligent conveyor devices and/or robotic arms. The one or more smart arrangement devices 104 may be modular shaped with a selective portion that may rotate and arrange each of the one or more objects. In embodiments, smart arrangement devices 104 may selectively align each of the objects to efficiently utilize the space in the smart storage area. For example, smart arrangement device may be configured to ensure sufficient space is provided for each object (e.g., preventing damage to the objects), based on object parameters. In some embodiments, as the system receives new luggage, the previous stored configuration is reconsidered. In some embodiments the configuration will stay the same, while in other embodiments the configuration will be reorganized.

In embodiments, while rearranging the cabin luggage on the shelf, the smart storage management system 100 may be changing the position of one or more object. In these embodiments, the smart storage management system 100 may identify any gap between any pair of stored objects and determine if the gap (e.g., space) is appropriate. If the gap is not appropriate (e.g., based on the object parameters), then the smart storage management system 100 may configure the smart arrangement devices 104 to arrange the objects until the spacing is appropriate. In embodiments, when arrangement or rearrangement is complete, the smart storage management system 100 may issue the user/passenger a notification or alert that includes the exact position of their stored object.

In some embodiments, smart storage management system 100 may configure AR module 106 to generate an AR environment. In embodiments, the AR environment may be provided to a user/passenger via an AR headset. In these embodiments, the AR environment may notify the user/passenger to where there is available storage space in the smart storage area. For example, AR module 106 may generate an AR environment that allows crew (e.g., users/passengers) to identify where there is available space (e.g., overhead storage space in an aircraft cabin) and/or a recommendation on where it may be best stored. In some embodiments, the AR environment may highlight or indicate using directional arrow to where the object should be stored or positioned within the smart storage area.

Figure 2:
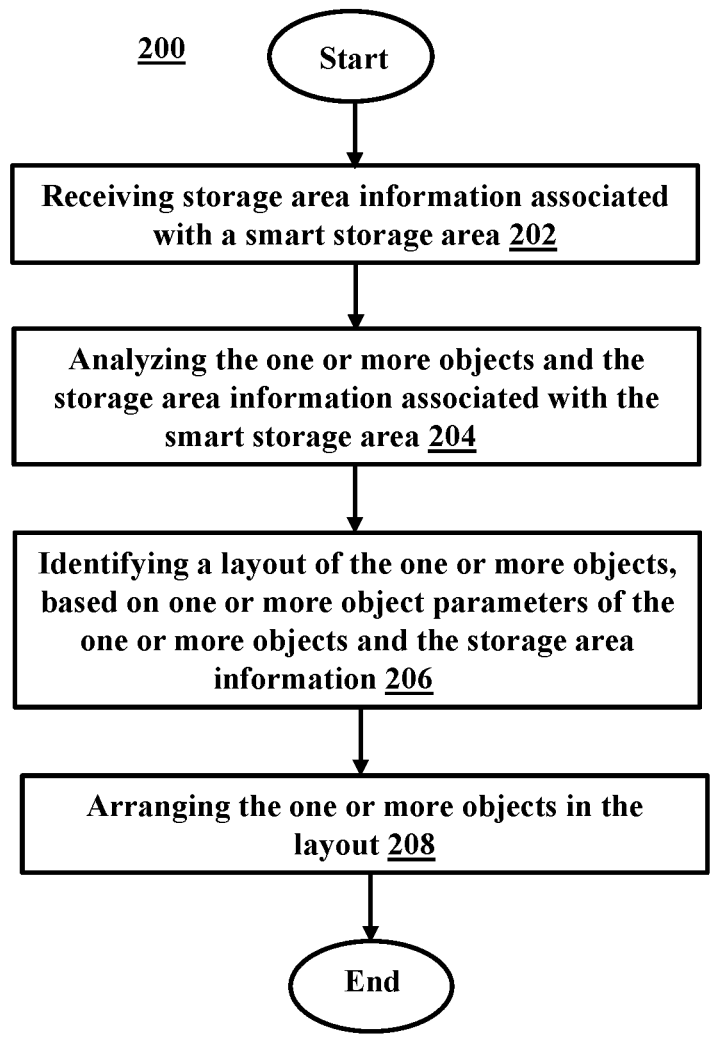
FIG. 2 illustrates a flowchart of a method for storing one or more objects in a smart storage area, in accordance with embodiments of the present disclosure.

Referring now to FIG. 2, a flowchart illustrating an example method 200 for storing one or more objects in a smart storage area, in accordance with embodiments of the present disclosure. FIG. 2 provides an illustration of only one implementation and does not imply any limitations with regard to the environments in which different embodiments may be implemented. Many modifications to the depicted environment may be made by those skilled in the art without departing from the scope of the invention as recited by the claims.

In some embodiments, the method 200 begins at operation 202 where a processor may receive storage area information of a smart storage area. In some embodiments, the method 200 proceeds to operation 204.

At operation 204, a processor may analyze the one or more objects associated with the smart storage area. In some embodiments, the method 200 proceeds to operation 206.

At operation 206, a processor may identify a layout of the one or more objects. In embodiments, a processor may base the layout on one or more object parameters of the one or more objects and the storage area information. In some embodiments, the method 200 proceeds to operation 208.

At operation 208, a processor may arrange the one or more objects in the layout. In some embodiments, as depicted in FIG. 2, after operation 208, the method 200 may end.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3A:
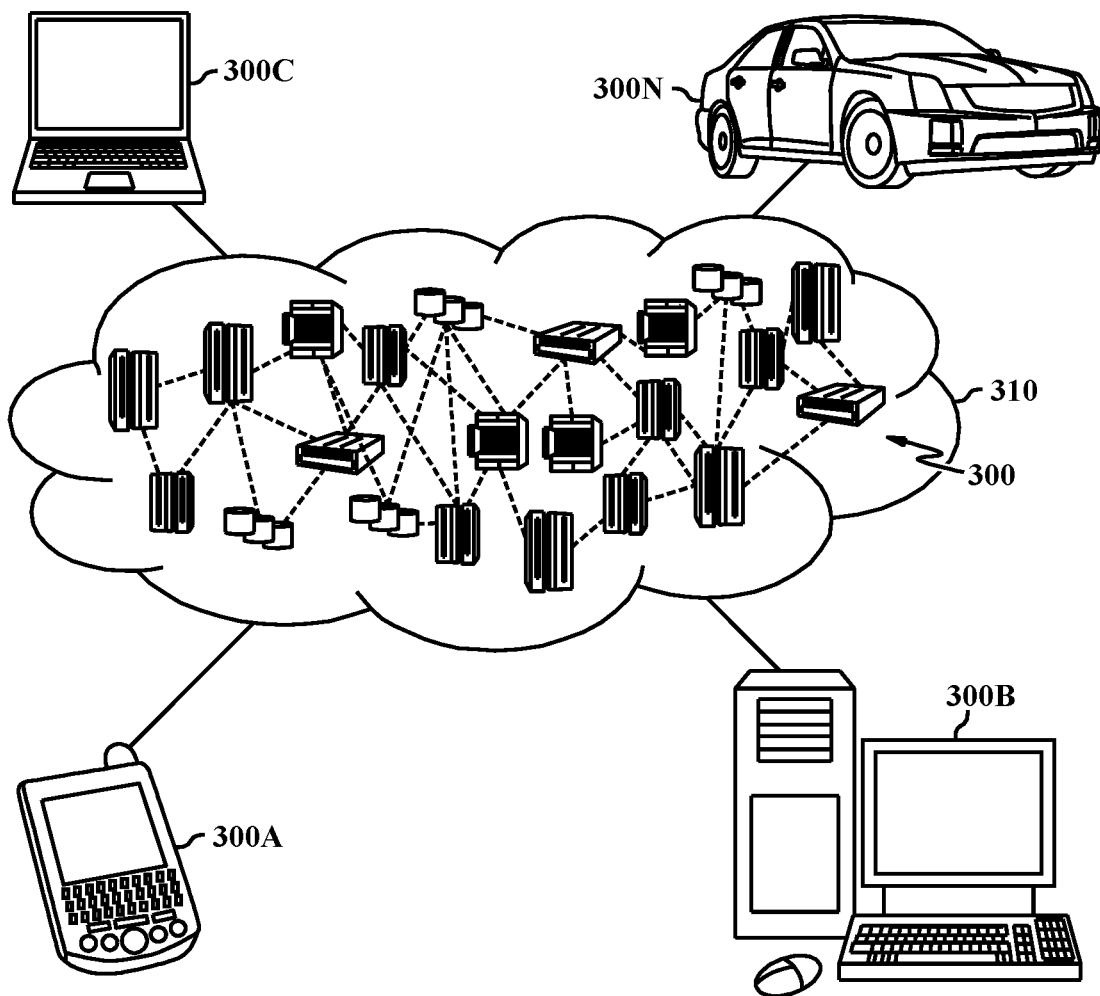
FIG. 3A illustrates a cloud computing environment, in accordance with embodiments of the present disclosure.

Referring now to FIG. 3A, illustrative cloud computing environment 310 is depicted. As shown, cloud computing environment 310 includes one or more cloud computing nodes 300 with which local computing devices used by cloud consumers, such as, for example, personal digital assistant (PDA) or cellular telephone 300A, desktop computer 300B, laptop computer 300C, and/or automobile computer system 300N may communicate. Nodes 300 may communicate with one another. They may be grouped (not shown) physically or virtually, in one or more networks, such as Private, Community, Public, or Hybrid clouds as described hereinabove, or a combination thereof. This allows cloud computing environment 310 to offer infrastructure, platforms and/or software as services for which a cloud consumer does not need to maintain resources on a local computing device. It is understood that the types of computing devices 300A-N shown in FIG. 3A are intended to be illustrative only and that computing nodes 300 and cloud computing 300 and cloud computing environment 310 can communicate with any type of computerized device over any type of network and/or network addressable connection (e.g., using a web browser).

Figure 3B:
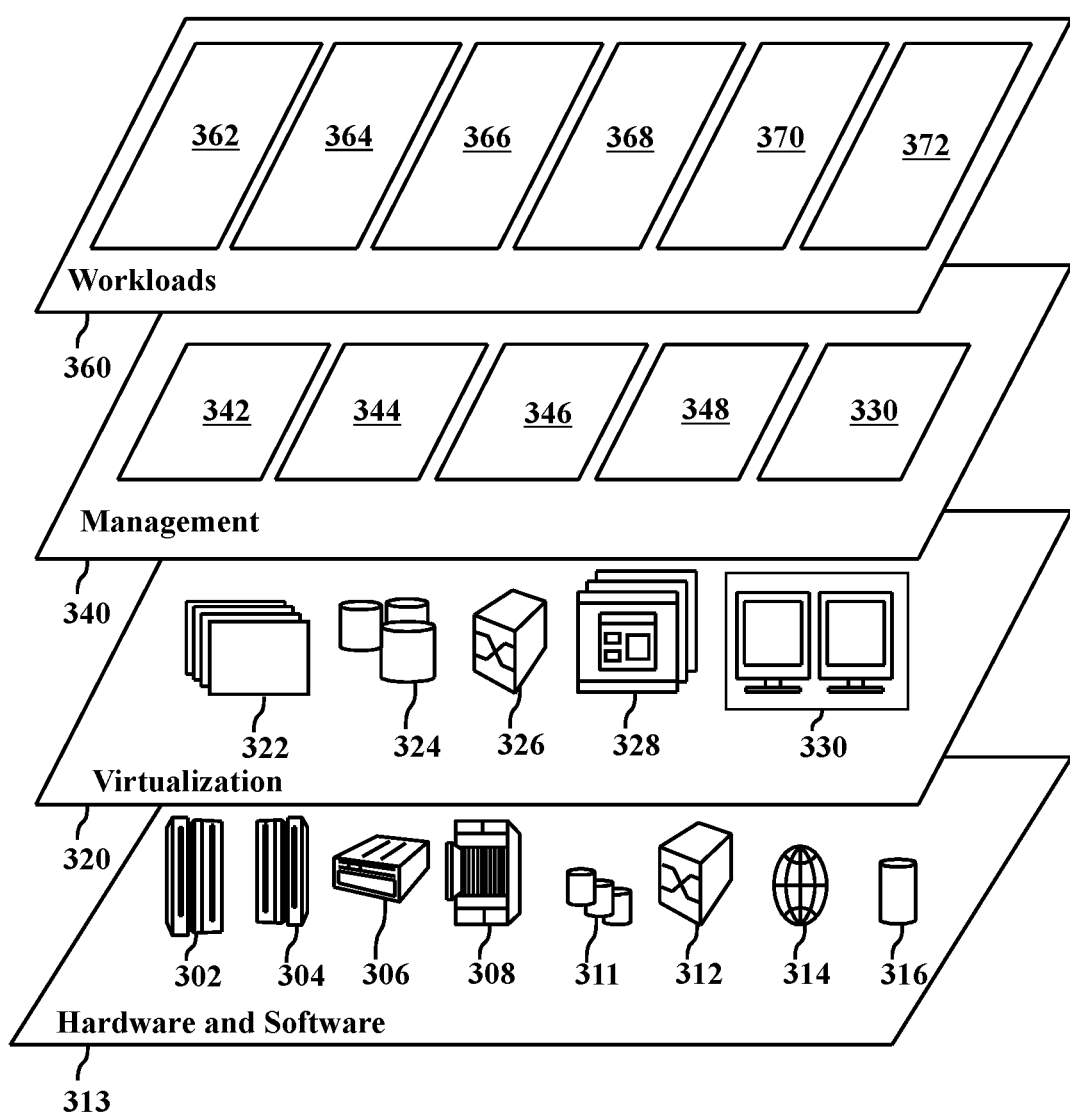
FIG. 3B illustrates abstraction model layers, in accordance with embodiments of the present disclosure.

Referring now to FIG. 3B, a set of functional abstraction layers provided by cloud computing environment 310 (FIG. 3A) is shown. It should be understood in advance that the components, layers, and functions shown in FIG. 3B are intended to be illustrative only and embodiments of the disclosure are not limited thereto. As depicted below, the following layers and corresponding functions are provided.

Hardware and software layer 315 includes hardware and software components. Examples of hardware components include: mainframes 302; RISC (Reduced Instruction Set Computer) architecture based servers 304; servers 306; blade servers 308; storage devices 311; and networks and networking components 312. In some embodiments, software components include network application server software 314 and database software 316.

Virtualization layer 320 provides an abstraction layer from which the following examples of virtual entities may be provided: virtual servers 322; virtual storage 324; virtual networks 326, including virtual private networks; virtual applications and operating systems 328; and virtual clients 330.

In one example, management layer 340 may provide the functions described below. Resource provisioning 342 provides dynamic procurement of computing resources and other resources that are utilized to perform tasks within the cloud computing environment. Metering and Pricing 344 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 346 provides access to the cloud computing environment for consumers and system administrators. Service level management 348 provides cloud computing resource allocation and management such that required service levels are met. Service Level Agreement (SLA) planning and fulfillment 350 provide pre-arrangement for, and procurement of, cloud computing resources for which a future requirement is anticipated in accordance with an SLA.

Workloads layer 360 provides examples of functionality for which the cloud computing environment may be utilized. Examples of workloads and functions which may be provided from this layer include: mapping and navigation 362; software development and lifecycle management 364; virtual classroom education delivery 366; data analytics processing 368; transaction processing 370; and object storing 372.

Figure 4:
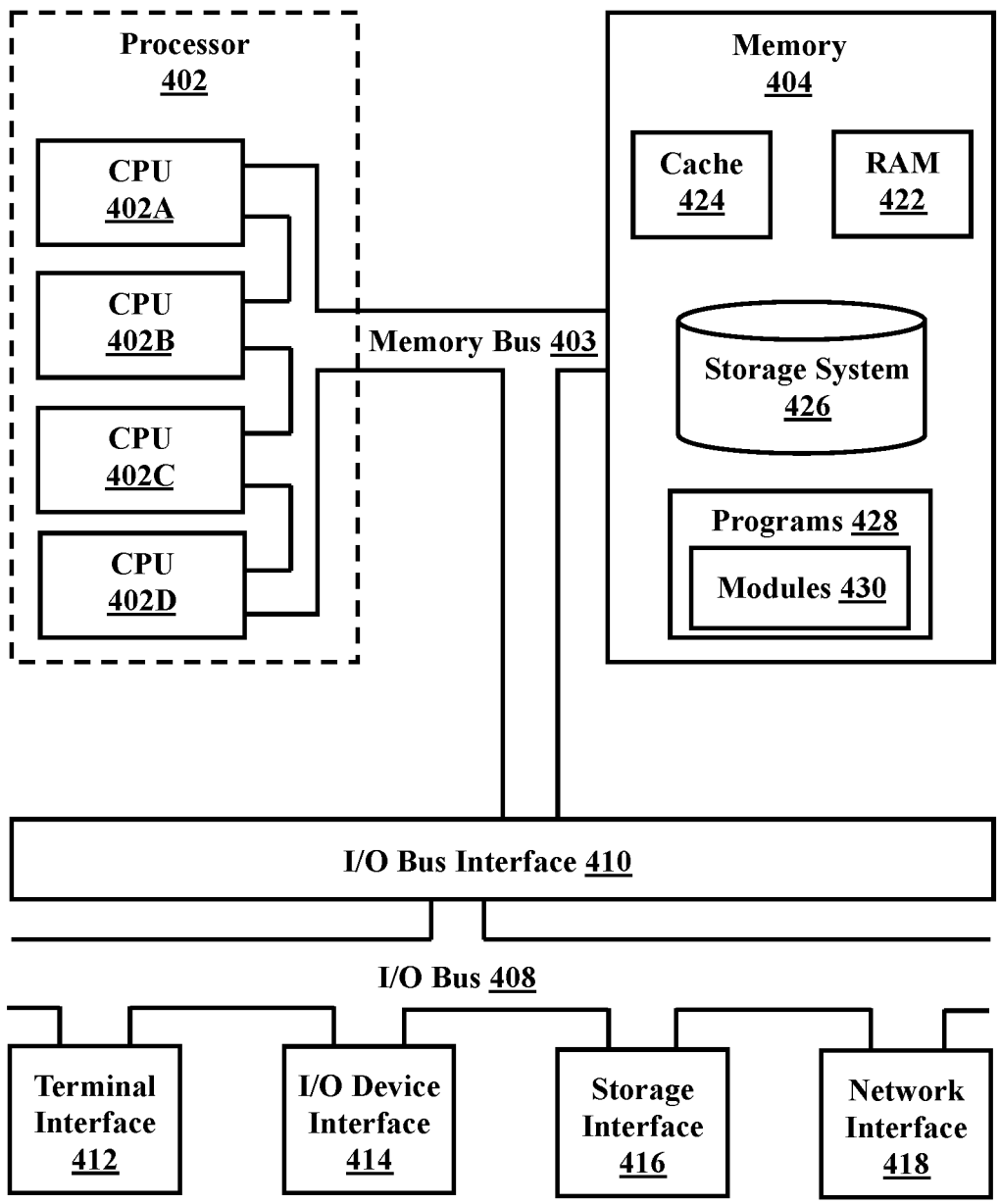
FIG. 4 illustrates a high-level block diagram of an example computer system that may be used in implementing one or more of the methods, tools, and modules, and any related functions, described herein, in accordance with embodiments of the present disclosure.

FIG. 4, illustrated is a high-level block diagram of an example computer system 401 that may be used in implementing one or more of the methods, tools, and modules, and any related functions, described herein (e.g., using one or more processor circuits or computer processors of the computer), in accordance with embodiments of the present invention. In some embodiments, the major components of the computer system 401 may comprise one or more Processor 402, a memory subsystem 404, a terminal interface 412, a storage interface 416, an I/O (Input/Output) device interface 414, and a network interface 418, all of which may be communicatively coupled, directly or indirectly, for inter-component communication via a memory bus 403, an I/O bus 408, and an I/O bus interface unit 410.

The computer system 401 may contain one or more general-purpose programmable central processing units (CPUs) 402A, 402B, 402C, and 402D, herein generically referred to as the CPU 402. In some embodiments, the computer system 401 may contain multiple processors typical of a relatively large system; however, in other embodiments the computer system 401 may alternatively be a single CPU system. Each CPU 402 may execute instructions stored in the memory subsystem 404 and may include one or more levels of on-board cache.

System memory 404 may include computer system readable media in the form of volatile memory, such as random access memory (RAM) 422 or cache memory 424. Computer system 401 may further include other removable/non-removable, volatile/non-volatile computer system storage media. By way of example only, storage system 426 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 404 can include flash memory, e.g., a flash memory stick drive or a flash drive. Memory devices can be connected to memory bus 403 by one or more data media interfaces. The memory 404 may include at least one program product having a set (e.g., at least one) of program modules that are configured to carry out the functions of various embodiments.

One or more programs/utilities 428, each having at least one set of program modules 430 may be stored in memory 404. The programs/utilities 428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 428 and/or program modules 430 generally perform the functions or methodologies of various embodiments.

Although the memory bus 403 is shown in FIG. 4 as a single bus structure providing a direct communication path among the CPUs 402, the memory subsystem 404, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 401 may, in some embodiments, contain multiple I/O bus interface units 410, multiple I/O buses 408, or both. Further, while multiple I/O interface units are shown, which separate the I/O bus 408 from various communications paths running to the various I/O devices, in other embodiments some or all of the I/O devices may be connected directly to one or more system I/O buses.

In some embodiments, the computer system 401 may be a multi-user mainframe computer system, a single-user system, or a server computer or similar device that has little or no direct user interface, but receives requests from other computer systems (clients). Further, in some embodiments, the computer system 401 may be implemented as a desktop computer, portable computer, laptop or notebook computer, tablet computer, pocket computer, telephone, smartphone, network switches or routers, or any other appropriate type of electronic device.

It is noted that FIG. 4 is intended to depict the representative major components of an exemplary computer system 401. In some embodiments, however, individual components may have greater or lesser complexity than as represented in FIG. 4, components other than or in addition to those shown in FIG. 4 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A method of storing one or more objects, the method comprising:
   receiving, by a processor, storage area information associated with a smart storage area;
   analyzing the one or more objects and the storage area;
   identifying one or more object parameters of the one or more objects;
   determining a layout of the one or more objects, wherein the layout includes a position of each of the one or more objects in the smart storage area based on the one or more object parameters and the storage area information;
   arranging the one or more objects, based on the layout;
   reconfiguring the layout in response to a change in the number of the one or more objects by generating an updated layout with one or more updated positions of the one or more objects in the smart storage area; and
   arranging the one or more objects based on the updated layout using a smart arrangement device.

2. The method of claim 1, further comprising:
   generating an augmented reality (AR) environment, wherein the AR environment is configured to display the smart storage area.

3. The method of claim 1, wherein arranging the one or more objects in the layout includes:
   configuring a smart arrangement conveyor device to arrange the one or more objects, wherein the smart arrangement conveyor device is in the smart storage area.

4. The method of claim 1, wherein analyzing the one or more objects associated with the smart storage area includes:
   identifying the one or more object parameters associated with each of the one or more objects;
   analyzing the storage area information, wherein analyzing the storage area information includes at least one available space for the one or more objects; and
   simulating the layout of the one or more objects in the smart storage area based, at least in part, on the one or more object parameters and the storage area information.

5. The method of claim 1, further comprising:
   analyzing the smart storage area in real-time, wherein the one or more objects are arranged in the layout;
   receiving a new object, wherein the new object includes one or more new object parameters;
   simulating the new object and the one or more objects in the smart storage area;
   updating the layout to a new layout; and
   rearranging the one or more objects and the new object in the smart storage area.

6. The method of claim 1, further comprising:
   generating an AR environment of the smart storage area to a user with a new object;
   identifying one or more object parameters of the new object;
   determining there is an available storage space in the smart storage area corresponding to the one or more object parameters of the new object;
   displaying a location of the available storage space in the AR environment to a user; and
   receiving the new object in the available storage space.

7. The method of claim 1, further comprising:
   determining at least one object of the one or more objects is being removed from the smart storage area;
   generating an updated layout, responsive to the removal of the at least one object of the one or more objects, wherein the updated layout includes updated positions of the one or more remaining objects in the smart storage area; and
   arranging the one or more remaining objects in the smart storage area, based on the updated layout, using a smart arrangement device.

8. A system for storing one or more objects, the system comprising:
   a memory; and
   a processor in communication with the memory, the processor being configured to perform operations comprising:
      receiving storage area information associated with a smart storage area;
      analyzing the one or more objects and the storage area information;
      identifying one or more object parameters of the one or more objects;
      determining a layout of the one or more objects, wherein the layout includes a position of each of the one or more objects in the smart storage area based on the one or more object parameters and the storage area information;
      arranging the one or more objects, based on the layout;
      reconfiguring the layout in response to a change in the number of the one or more objects by generating an updated layout with one or more updated positions of the one or more objects in the smart storage area; and
      arranging the one or more objects based on the updated layout using a smart arrangement device.

9. The system of claim 8, further comprising:
generating an augmented reality (AR) environment, wherein the AR environment is configured to display the smart storage area.

10. The system of claim 9, wherein the AR environment is generated based, at least in part, on one or more simulations of a digital twin of the smart storage area.

11. The system of claim 8, wherein arranging the one or more objects in the layout includes:
configuring a smart arrangement device to arrange the one or more objects, wherein the smart arrangement device is in the smart storage area.

12. The system of claim 8, wherein analyzing the one or more objects associated with the smart storage area includes:
identifying the one or more object parameters associated with each of the one or more objects;
analyzing the storage area information, wherein analyzing the storage area information includes at least one available space for the one or more objects; and
simulating the layout of the one or more objects in the smart storage area based, at least in part, on the one or more object parameters and the storage area information.

13. The system of claim 8, further comprising:
analyzing the smart storage area in real-time, wherein the one or more objects are arranged in the layout;
receiving a new object, wherein the new object includes one or more new object parameters;
simulating the new object and the one or more objects in the smart storage area;
updating the layout to a new layout; and
rearranging the one or more objects and the new object in the smart storage area.

14. The system of claim 13, wherein arranging the one or more objects in the layout is based at least in part on a layout factor, wherein the layout factor affects the layout.

15. A computer program product for storing one or more objects, the computer program product comprising a computer readable storage medium having program instructions embodied therewith, the program instructions executable by a processor to cause the processor to perform a function, the function comprising:
receiving storage area information associated with a smart storage area;
analyzing the one or more objects and the storage area information;
identifying one or more object parameters of the one or more objects;
determining a layout of the one or more objects, wherein the layout includes a position of each of the one or more objects in the smart storage area based on the one or more object parameters and the storage area information;
arranging the one or more objects, based on the layout;
reconfiguring the layout in response to a change in the number of the one or more objects by generating an updated layout with one or more updated positions of the one or more objects in the smart storage area; and
arranging the one or more objects based on the updated layout using a smart arrangement device.

16. The computer program product of claim 15, further comprising:
generating an augmented reality (AR) environment, wherein the AR environment is configured to display the smart storage area.

17. The computer program product of claim 16, wherein the AR environment is generated based, at least in part, on one or more simulations of a digital twin of the smart storage area.

18. The computer program product of claim 15, wherein arranging the one or more objects in the layout includes:
configuring a smart arrangement device to arrange the one or more objects, wherein the smart arrangement device is in the smart storage area.

19. The computer program product of claim 15, wherein analyzing the one or more objects associated with the smart storage area includes:
identifying the one or more object parameters associated with each of the one or more objects;
analyzing the storage area information, wherein analyzing the storage area information includes at least one available space for the one or more objects; and
simulating the layout of the one or more objects in the smart storage area based, at least in part, on the one or more object parameters and the storage area information.

20. The computer program product of claim 15, further comprising:
analyzing the smart storage area in real-time, wherein the one or more objects are arranged in the layout;
receiving a new object, wherein the new object includes one or more new object parameters;
simulating the new object and the one or more objects in the smart storage area;
updating the layout to a new layout; and
rearranging the one or more objects and the new object in the smart storage area.

\* \* \* \* \*